(No Model.)
H. S. OWEN.
WHEEL FOR BICYCLES.
No. 497,966. Patented May 23, 1893.
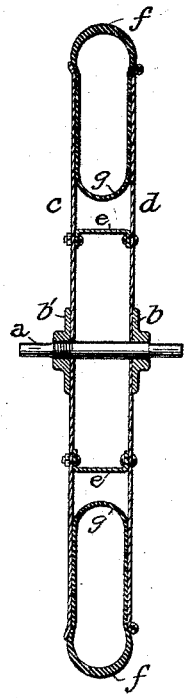
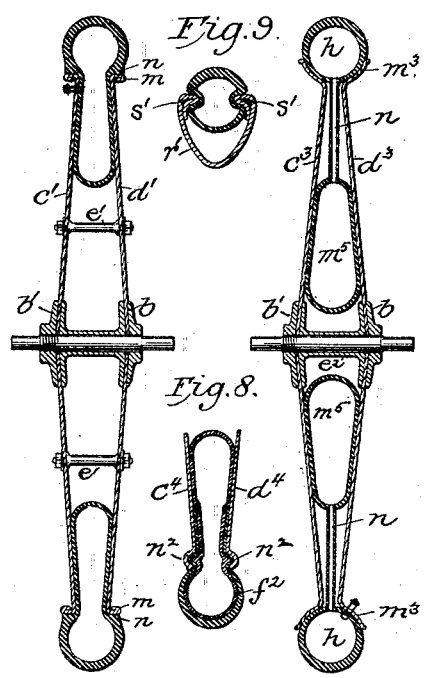
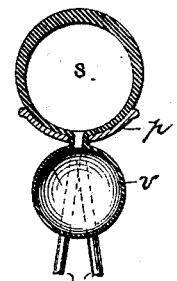
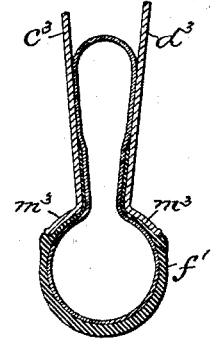
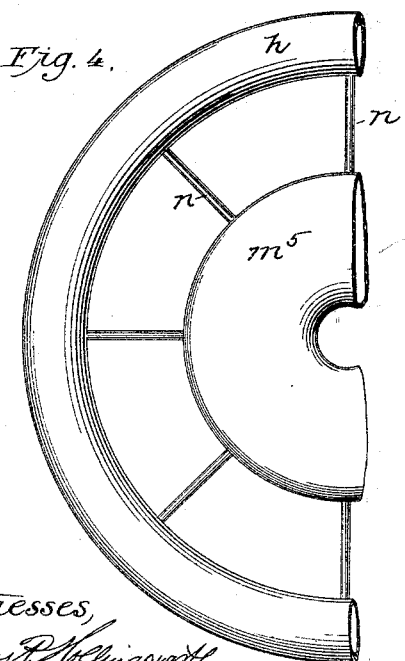
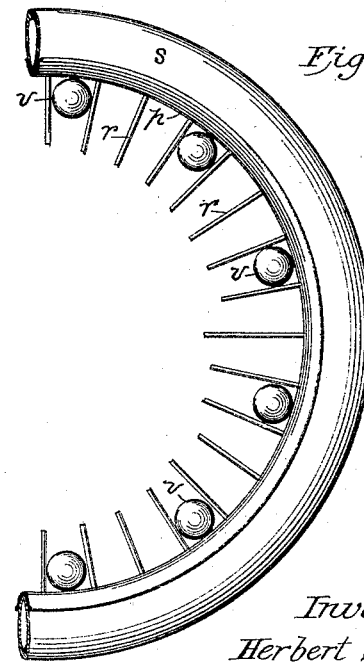
Witnesses,
Sidney P. Hollingsworth
Vinton Coombs
Inventor,
Herbert S. Owen,
by his attorneys,
Fennie & Goldsborough
THE NORRIS PETERS CO., PHOTO-LITHO., WASHINGTON, D. C.

UNITED STATES PATENT OFFICE.

HERBERT S. OWEN, OF WASHINGTON, DISTRICT OF COLUMBIA.

WHEEL FOR BICYCLES.

SPECIFICATION forming part of Letters Patent No. 497,966, dated May 23, 1893.

Application filed January 10, 1893. Serial No. 457,920½. (No model.)

*To all whom it may concern:*

Be it known that I, HERBERT S. OWEN, a citizen of the United States, residing at Washington, in the District of Columbia, have invented certain new and useful Improvements in Wheels for Bicycles and other Vehicles; and I do hereby declare the following to be a full, clear, and exact description of the invention, such as will enable others skilled in the art to which it appertains to make and use the same.

My invention relates to wheels for bicycles and other vehicles having their tread portion made up of an inflatable tire adapted to contain a filling fluid, as for instance, air under pressure.

The object of the invention, in its generic aspect, is to provide against the liability of the rupture of the tire by such an arrangement as will permit any excessive local compression at the point of contact of the wheel with the ground, due to surmounting obstructions in the road bed, to be instantly compensated for or taken up by an expansion receptacle or chamber in direct and free communication with the tread portion of the tire and which will immediately relieve the dangerous strain thus imposed upon the tread.

My invention, also permits the manufacture of a highly efficient tire at small expense.

In the accompanying drawings, Figure 1 represents, in vertical section, one form of wheel embodying the generic features of my invention. Fig. 2 represents a vertical section of a modification thereof. Fig. 3 represents a vertical section of a further modification. Fig. 4 represents a side elevation of a portion of the same with the proximate wheel plate removed. Fig. 5 represents a partial section of a still further modification. Fig. 6 represents a side elevation of a portion of said modification; and Figs. 7, 8 and 9 represent partial sections of further modifications.

Similar letters of reference indicate similar parts throughout the several views.

Referring to Fig. 1 of the drawings, $a$ indicates the wheel axle, and $c$, $d$, the sides of the wheel, which sides in this instance, are made up of disk walls of sheet metal or other sheet material of a kind and thickness appropriate to the use to which the wheel is to be applied and of substantially the diameter of the wheel.

The disk walls are adapted to be held apart in a fixed relationship to each other by means for instance of a complete or broken flanged annular partition $e$ riveted to one of the walls and secured to the other by screw bolts and nuts, as shown. Or instead of said partition, through bolts $e'$ may be employed, as indicated in Fig. 2; or, if desired, the partition and through bolts may both be dispensed with, as indicated in Fig. 3, wherein the spacing between the disk walls is preserved by means of the flanged sleeve $e^2$. I prefer, however, even where the flanged sleeve $e^2$ is employed, to make use in addition thereto of either the partition $e$ or the through bolts $e'$ so as to further brace and strengthen the wheel.

A retaining washer $b$ is brazed, shrunk, or otherwise secured upon the axle $a$, and said axle is preferably screw-threaded at its opposite end for the reception of the internally screw-threaded retaining nut or washer $b'$. This construction permits the disk walls to be firmly fixed upon the axle, so as to rotate therewith. It is evident, however, that in some instances, the disk walls may be mounted loosely upon the axle $a$, as, for instance when the axle is fixed to the body or frame work of a vehicle.

In the form of the invention shown in Fig. 1, there is firmly clamped between the disk walls $c$ $d$, an inflatable circular receptacle whose inner wall $g$ is sufficiently firm to substantially maintain its position under the usual shocks of travel but which is sufficiently elastic to expand and compensate for such excessive local compressions as would have a tendency to rupture the tire. The outer or tread portion $f$ of the tire extends beyond the wheel sides and is of less elasticity than the wall $g$, so that the expansion will take place at said latter wall, ample free space being provided for that purpose, as shown. This difference in elasticity between the tread portion and the inner wall $g$, I may obtain by thickening the tread portion of the inflatable receptacle, as indicated in Fig. 1, and also in Figs. 2 and 9; or by covering the tread portion with a wearing jacket as shown at $f'$ in Fig. 7 and at $f^2$ in Fig. 8.

The partition $e$ or its equivalent serves to limit the expansion of the inner wall $g$ so as to guard against bursting of the expansive receptacle, and the additional large volume of compressed air afforded by the increased dimensions of the receptacle in comparison with the dimensions of the usual pneumatic tire augments the elastic qualities of the wheel and more effectually distributes its strains. As shown in Fig. 2, the disk walls $c'$, $d'$, may converge somewhat toward each other at their outer peripheries so as to exercise a more effective clamping action upon the fluid-containing receptacle. Annular edge flanges $m$ are also preferably provided against which rest corresponding shoulders $n$ of the rim portion of the inflated receptacle. The function of these flanges and shoulders is to insure that the rim portion of the inflated receptacle shall not be forced in between the disk walls. Similar edge flanges $m^3$ are provided for the disk walls $c^3$ $d^3$ in the form of wheel shown in Fig. 7, co-operating with similar shoulders $n'$ formed upon the flexible cover portion of the tread. For a like purpose, in the form shown in Fig. 8, the disk walls $c^4$ $d^4$ are provided with re-entering flanges $n^2$ constituting holding recesses or depressions engaging with corresponding shoulders formed upon the covered receptacle, or into which the operation of inflating the receptacle may force portions of the wall thereof.

In Figs. 3 and 4, the same general construction shown in Fig. 2 is preserved with the exception that the tread portion $h$ of the tire is formed of an independent pneumatic tire connected by rubber tubes $n$ from point to point with the expansion chamber $m^5$, which, in this case, is elastic or yielding at either its outer periphery, or its inner periphery, or both.

In the form of the invention illustrated in Figs. 5 and 6, the wheel felly $p$ is supported from the hub by the usual spokes $r$, and, from point to point about the inner periphery of the pneumatic tube $s$ and supported within the felly, are arranged expansion bulbs or chambers $v$ communicating freely with the interior of the pneumatic tube, as shown.

In the form of the invention shown in Fig. 9, $r'$ indicates a wheel felly having the edge flanges $s'$ adapted to engage with annular channels either formed permanently in the inflatable tire or formed by the operation of inflating the tire. The thickened tread is in this case also of less elasticity than the inner wall of the tire and the space between the felly and tire provides room for the expansion of said inner wall, the normal condition of the tire being as indicated in the figures.

It is characteristic of all of the forms or modifications of the invention that the part constituting the expansion chamber is in direct communication with the tread portion of the tire and about the inner periphery of the tread, so that the expansion chamber serves to at once take up and compensate for such sudden local compressions of the fluid in the tread portion as would tend to rupture the tire. So far as I am aware the provision of an expansion chamber for this purpose and in this general relationship below the rim or rim line is new with me and I desire to be understood as claiming it broadly, in addition to the specific constructions set forth for carrying it into effect.

Having thus described my invention, what I claim, and desire to secure by Letters Patent, is—

1. A wheel for bicycles and other vehicles provided with a fluid containing tire having a flexible fluid-containing chamber or compartment communicating therewith or forming part thereof, said chamber or compartment being unconfined at some portion of its circumferential periphery so as to serve as an expansion or relief chamber to the tire; substantially as described.

2. A wheel for bicycles and other vehicles provided with a fluid containing tire having a flexible fluid-containing chamber or compartment communicating therewith or forming part thereof, said chamber or compartment being unconfined at some portion of its circumferential periphery so as to serve as an expansion or relief chamber to the tire and means for limiting the amount of said expansion; substantially as described.

3. A wheel for bicycles and other vehicles consisting of walls or sides of substantially the diameter of the wheel, the said walls inclining toward each other at their peripheries and containing between them a flexible fluid containing receptacle occupying a portion only of the space between the center of the wheel and its periphery, and a flexible fluid-containing tire communicating with said receptacle; substantially as described.

4. A wheel for bicycles and other vehicles consisting of walls or sides of substantially the diameter of the wheel, the said walls containing between them a flexible fluid containing receptacle occupying only a portion of the space between the center of the wheel and its periphery, and a flexible fluid-containing tire communicating with said receptacle; substantially as described.

5. A wheel for bicycles and other vehicles consisting of walls or sides of substantially the diameter of the wheel the said walls having peripheral flanges and containing between them a flexible fluid containing receptacle projecting beyond the periphery of the walls to form a tire, said receptacle being provided with shoulders co-operating with said flanges, and an expansion space being left between the inner wall of the said receptacle and the center of the wheel; substantially as described.

6. A wheel for bicycles and other vehicles consisting of walls or sides of substantially the diameter of the wheel the said walls containing between them a flexible fluid containing receptacle projecting beyond the periphery of the walls to form a tire, an expansion space being left between the inner wall of the said receptacle and the center of the wheel; substantially as described.

7. A wheel for bicycles and other vehicles consisting of disk walls or sides of substantially the diameter of the wheel, the said walls containing between them a circular flexible fluid-containing receptacle projecting beyond the periphery of the disk walls to form a tire, an expansion space being left between the inner wall of the said receptacle and the center of the wheel; substantially as described.

8. A wheel for bicycles and other vehicles provided with a fluid containing tire having an elastic inner periphery and a thickened tread, a space being provided for the expansion of said inner periphery beyond its normal limit; substantially as described.

9. A wheel for bicycles and other vehicles provided with a fluid containing tire having an elastic inner periphery and a tread portion, a space being provided for the expansion of said inner periphery beyond its normal limit and means for preventing the tread portion of the tire from being forced out of place; substantially as described.

10. A wheel for bicycles and other vehicles provided with a fluid containing tire having an elastic inner periphery and a tread portion, a space being provided for the expansion of said inner periphery beyond its normal limit and opposing shoulders or flanges upon the tire and wheel preventing the tread portion of the tire from being forced out of place; substantially as described.

11. A wheel for bicycles and other vehicles provided with a fluid containing tire having an elastic inner periphery and a tread portion, a space being provided for the expansion of said inner periphery beyond its normal limit and interlocking shoulders or flanges upon the tire and wheel preventing the tread portion of the tire from being forced out of place; substantially as described.

In testimony whereof I affix my signature in presence of two witnesses.

HERBERT S. OWEN.

Witnesses:
JOHN C. PENNIE,
J. A. GOLDSBOROUGH.